(12) United States Patent
Kremer et al.

(10) Patent No.: US 12,410,744 B2
(45) Date of Patent: Sep. 9, 2025

(54) INTERNAL COMBUSTION ENGINE FOR A MOTOR VEHICLE, IN PARTICULAR FOR A MOTOR CAR

(71) Applicant: Mercedes-Benz Group AG, Stuttgart (DE)

(72) Inventors: Adolf Kremer, Remseck (DE); Steffen Loll, Stuttgart (DE); Frederic Brunelle, Stuttgart (DE); Markus Fenzl, Forchtenberg (DE); Andreas Schaible, Weil im Schoenbuch (DE); Bastian Ruetzel, Bruchsal (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/693,685

(22) PCT Filed: Aug. 11, 2022

(86) PCT No.: PCT/EP2022/072591
§ 371 (c)(1),
(2) Date: Mar. 20, 2024

(87) PCT Pub. No.: WO2023/046361
PCT Pub. Date: Mar. 30, 2023

(65) Prior Publication Data
US 2024/0384681 A1    Nov. 21, 2024

(30) Foreign Application Priority Data
Sep. 21, 2021    (DE) ............... 10 2021 004 774.5

(51) Int. Cl.
*F02B 39/00*    (2006.01)
*F01N 3/05*    (2006.01)
(Continued)

(52) U.S. Cl.
CPC ............. *F02B 39/00* (2013.01); *F01N 3/05* (2013.01); *F01N 3/323* (2013.01); *F02B 37/168* (2013.01); *F01N 2550/14* (2013.01)

(58) Field of Classification Search
CPC ........ F02B 39/00; F02B 37/16; F02B 37/168; F01N 2550/14; F01N 3/05; F01N 3/30;
(Continued)

(56) References Cited

U.S. PATENT DOCUMENTS 4,404,795 A * 9/1983 Oishi .................. F01N 3/222
60/303
2004/0020189 A1    2/2004 Hirooka et al.

FOREIGN PATENT DOCUMENTS

DE          43 38 696 A1    5/1995
DE    10 2007 057 603 A1    6/2009
(Continued)

OTHER PUBLICATIONS

International Search Report (PCT/ISA/210) issued in PCT Application No. PCT/EP2022/072591 dated Sep. 29, 2022 (2 pages).
(Continued)

*Primary Examiner* — Loren C Edwards
(74) *Attorney, Agent, or Firm* — Crowell & Moring LLP

(57) ABSTRACT

An internal combustion engine includes a suction tract, a compressor disposed in the suction tract, and an exhaust tract. A secondary air system is fluidically connected to the exhaust tract at an introduction point and to the suction tract at a first branching point downstream of the compressor where a part of air compressed by the compressor is branchable off from the suction tract and is introducible into the exhaust tract at the introduction point. The secondary air system is fluidically connected to the suction tract at a second branching point upstream of the compressor where a part of air is branchable off from the suction tract by the
(Continued)

secondary air system and is introducible into the exhaust tract at the introduction point. Air branched off at the second branching point is feedable through the secondary air system and is feedable to the introduction point by a secondary air pump.

9 Claims, 1 Drawing Sheet

(51) Int. Cl.
*F01N 3/32* (2006.01)
*F02B 37/16* (2006.01)

(58) Field of Classification Search
CPC ... F01N 3/32; F01N 3/323; F01N 3/22; F01N 1/14; F01N 2270/00–10
See application file for complete search history.

(56) References Cited

FOREIGN PATENT DOCUMENTS

| | | | |
|---|---|---|---|
| DE | 10 2009 043 087 A1 | 3/2011 | |
| DE | 10 2013 226 063 A1 | 6/2015 | |
| DE | 10 2016 211 274 A1 | 12/2017 | |
| DE | 10 2019 008 956 A1 | 7/2020 | |
| EP | 1722080 B1 * | 8/2013 | ............ F01N 3/32 |
| JP | 59-168532 U | 11/1984 | |
| JP | 61-105713 U | 7/1986 | |
| JP | 2003-056392 A | 2/2003 | |
| JP | 2007-224863 A | 9/2007 | |

OTHER PUBLICATIONS

Japanese-language Office Action issued in Japanese Application No. 2024-516602 dated Jan. 7, 2025 (4 pages).

* cited by examiner

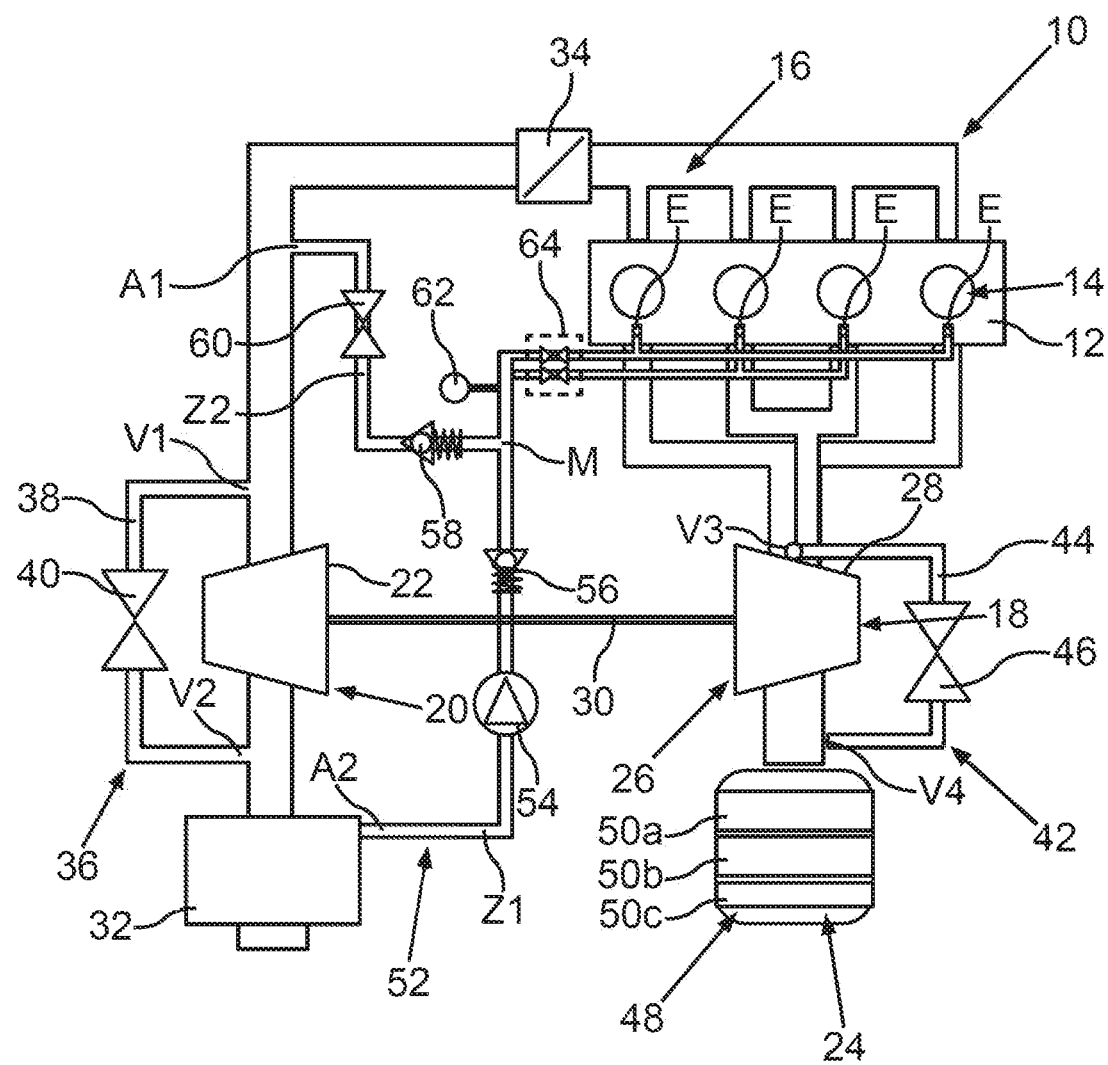

INTERNAL COMBUSTION ENGINE FOR A MOTOR VEHICLE, IN PARTICULAR FOR A MOTOR CAR

BACKGROUND AND SUMMARY OF THE INVENTION

The invention relates to an internal combustion engine for a motor vehicle, in particular for a motor car.

Such an internal combustion engine for a motor vehicle, in particular for a motor car, can for example be taken as known from DE 10 2007 057 603 A1. The internal combustion engine has a suction tract which can be flowed through by air, in which suction tract a compressor is arranged to compress the air flowing through the suction tract. In addition, the internal combustion engine has an exhaust tract, which can be flowed through by exhaust gas of the internal combustion engine, and a secondary air system, which is fluidically connected to the suction tract at at least one introduction point. The secondary air system is fluidically connected to the suction tract at a branching point arranged downstream of the compressor. At least a part of the air compressed by means of the compressor can be branched off from the suction tract at the branching point by means of the secondary air system and introduced into the secondary air system. The air branched off from the suction tract at the branching point and then introduced into the secondary air system can flow through the system, and is fed to the introduction point by means of the secondary air system, and introduced into the exhaust tract at the introduction point.

DE 10 2013 226 063 A1 further discloses an internal combustion engine, having a combustion motor, a fresh gas train having a compressor and an exhaust train having an exhaust gas post-treatment device and a temperature sensor.

The object of the invention is to develop an internal combustion engine of the kind specified in the introduction such that a particularly low-emission operation can be implemented.

In order to develop an internal combustion engine of the kind specified herein such that a particularly low-emission operation can be implemented, it is provided according to the invention that the secondary air system is also fluidically connected to the suction tract at a second branching point arranged upstream of the compressor. At least a part of the air flowing through the suction tract upstream of the compressor can be branched off from the suction tract at the second branching point by means of the secondary air system and introduced into the secondary air system. The air branched off from the exhaust tract at the second branching point and introduced into the secondary air system can flow through the secondary air system, and is guided to the introduction point by means of the secondary air system, and introduced into the exhaust tract as secondary air. The secondary air system can thus branch off air from the suction tract both at the first branching point, and thus downstream of the compressor, and at the second branching point, and thus upstream of the compressor, and feed the air to the introduction point as secondary air, and introduce it into the exhaust tract at the introduction point.

The secondary air system has a secondary air pump, by means of which the air branched off at the second branching point can be fed through the secondary air system and fed to the introduction point, and in particular fed into the exhaust tract. A particularly advantageous secondary air injection, which is particularly as required, can thus be implemented via the invention. The secondary air injection should be understood to mean that the air branched off at the respective branching point can be introduced into the exhaust tract as secondary air at the introduction point, in particular while bypassing combustion chambers or all combustion chambers of the internal combustion engine. The air which is branched off from the suction tract at the first branching point, and thus downstream of the compressor, is also described as compressor air. The invention in particular makes it possible, for example, to introduce, i.e., to inject both the compressor air and the air branched off from the suction tract at the second branching point into the exhaust tract, for example from a particular point in time onwards. For example, the introduction point is arranged in an exhaust conduit, in particular in an outlet conduit, whereby the secondary air can be particularly advantageously injected into the exhaust tract. For example, the introduction point is arranged in an outlet conduit in particular formed or delimited by a cylinder head of the internal combustion engine. In particular, several, in particular all exhaust conduits, in particular outlet conduits, of the internal combustion engine can have a respective introduction point, at which the secondary air can be injected into the exhaust tract. The invention in particular makes it possible to introduce an advantageously large quantity of secondary air into the exhaust tract in all operating regions of the internal combustion engine, also described as a combustion motor, and preferably designed as a reciprocating piston motor, and thus to make a particularly low-emission operation of the internal combustion engine possible.

Further advantages, features and details of the invention result from the following description of a preferred exemplary embodiment and with reference to the drawing. The features and combinations of features previously specified in the description and the features and combinations of features specified in the following description of the FIGURE and/or shown only in the single FIGURE can be used not only in the specified combination, but also in other combinations or in isolation, without leaving the scope of the invention.

BRIEF DESCRIPTION OF THE DRAWING

In the single FIGURE, the drawing shows a schematic depiction of an internal combustion engine for a motor vehicle, in particular for a motor car, having a secondary air system.

DETAILED DESCRIPTION OF THE DRAWING

In a schematic depiction, the single FIGURE shows an internal combustion engine 10 for a motor vehicle, in particular for a motor car. The internal combustion engine 10 has an engine block 12, also described as a cylinder block, by which cylinders 14 of the internal combustion engine 10 are formed. The respective cylinder 14 delimits a respective combustion chamber, in which combustion processes take place during a fired operation of the internal combustion engine 10. Exhaust gas of the internal combustion engine 10 results from the respective combustion process. The internal combustion engine 10 has a suction tract 16 which can be flowed through by air, by means of which the air flowing through the suction tract 16 is fed to the combustion chambers and into the combustion chambers of the internal combustion engine 10. The internal combustion engine has an exhaust gas turbocharger 18, which has a compressor 20 arranged in the suction tract 16, having a compressor wheel 22 arranged in the suction tract 16. The air flowing through the suction tract 16 can be compressed by means of the compressor wheel 22, and thus by means of the compressor 20. Compressing the air flowing through the suction tract 16 is also described as charging, meaning that the compressed air is also described as charge air.

The internal combustion engine 10 also has an exhaust tract 24, which can be flowed through by the exhaust gas from the combustion chamber, and thus by the exhaust gas from the internal combustion engine 10. The exhaust gas turbocharger 18 has a turbine 26 arranged in the exhaust tract 24, the turbine having a turbine wheel 28 arranged in the exhaust tract 24, which turbine wheel can be driven by means of the exhaust gas flowing through the exhaust tract 24. The compressor wheel 22 can be driven by the turbine wheel 28 via a shaft 30 of the exhaust gas turbocharger 18, whereby the air flowing through the suction tract 16 can be compressed. An air filter 32 is arranged in the suction tract 16 upstream of the compressor 20, i.e., upstream of the compressor wheel 22, by means of which air filter the air flowing through the suction tract 16 is filtered. A throttle flap 34 is additionally arranged in the suction tract 16, downstream of the compressor 20 and upstream of the combustion chambers, by means of which, for example, a respective quantity of the air flowing into the respective combustion chamber can be adjusted.

An air recirculation system 36 having an air recirculation conduit 38 is assigned to the compressor 20, which air recirculation conduit is fluidically connected to the suction tract 16 at connecting points V1 and V2. By means of the air recirculation conduit 38, at least a part of the air flowing through the suction tract 16 can be branched off from the suction tract 16 at a connecting point V1 and introduced into the air recirculation conduit 38. The air introduced into the air recirculation conduit 38 can flow through the air recirculation conduit 38, and is fed to the introduction point V2 by means of the air recirculation conduit 38, and can flow into the suction tract 16 again at the connecting point V2. It can be seen that the connecting point V2 is arranged downstream of the air filter 32 and upstream of the compressor wheel 22, wherein the connecting point V1 is arranged downstream of the compressor wheel 22 and upstream of the throttle flap 34. The air recirculation system 36 additionally comprises an air recirculation valve 40, which is arranged in the air recirculation conduit 38. For example, a quantity of the air flowing through the air recirculation conduit 38 can be adjusted by means of the air recirculation valve 40. In particular, the air recirculation valve 40 is designed as an electric air recirculation valve.

A bypass device 42 is assigned to the turbine 26, which bypass device has a bypass conduit 44. The bypass conduit 44 is fluidically connected to the exhaust tract 24 at a connecting point V3 and at a connecting point V4. By means of the bypass conduit 44, at least a part of the exhaust gas flowing through the exhaust tract 24 can be branched off from the exhaust tract 24 at the connecting point V3 and introduced into the bypass conduit 44. The exhaust gas introduced into the bypass conduit 44 can flow through the bypass conduit 44, and is fed to the connecting point V4 by means of the bypass conduit 44, and can flow back into the exhaust tract 24 at the connecting point V4. The exhaust gas flowing through the bypass conduit 44 bypasses the turbine 26, and thus drives the turbine wheel 28. The bypass conduit 44 is also described as a bypass or wastegate. The bypass device 42 comprises a bypass valve 46, which is also described as a wastegate valve, and is arranged in the bypass conduit 44. A quantity of the exhaust gas flowing through the bypass conduit 44 can be adjusted by means of the bypass valve 46. It can be seen that the connecting point V3 is arranged upstream of the turbine 26, i.e., upstream of the turbine wheel 28, the connecting point V4 being arranged downstream of the turbine wheel 28, i.e., downstream of the turbine 26.

An exhaust gas post-treatment device 48 is additionally assigned in the exhaust tract 24, which exhaust gas post-treatment device is arranged downstream of the turbines 26, in particular downstream of the connecting point V4. The exhaust gas post-treatment device 48 can be flowed through by the exhaust gas of the internal combustion engine, and can post-treat the exhaust gas. For this purpose, the exhaust gas post-treatment device for example comprises exhaust gas post-treatment elements 50a-c. The exhaust gas post-treatment element 50a is for example designed as a catalyst, in particular as a 3-way catalyst. The exhaust gas post-treatment element 50b is for example designed as a particle filter, in particular as a petrol particulate filter (OPF). The exhaust gas post-treatment element 50c is for example designed as a catalyst. In particular, the internal combustion engine also described as a combustion motor or motor can be designed as a petrol motor.

The internal combustion engine 10 also has a secondary air system 52. The secondary air system 52 is fluidically connected to the suction tract 16 at a first branching point A1. The secondary air system 52 is additionally fluidically connected to the exhaust tract 24 at introduction points E. In particular, at least or exactly one introduction point E can be provided per combustion chamber, at which introduction point the secondary air system 52 is fluidically connected to the exhaust tract 24. It is in particular conceivable that the introduction point E is arranged, in particular directly, in an exhaust conduit, in particular in an outlet conduit. For example, the outlet conduit is formed, i.e., delimited, by a cylinder head of the internal combustion engine 10. The cylinder head is designed separately from the engine block 12, and connected to the engine block 12. In particular, the cylinder head forms a combustion chamber roof for the respective combustion chamber.

It can be seen that the first branching point A1 is arranged downstream of the compressor 20, and thus downstream of the compressor wheel 22. In the exemplary embodiment shown in the FIGURE, the first branching point A1 is arranged downstream of the connecting point V1 and upstream of the throttle flap 34. The secondary air system 52, at least a part of the air compressed by the compressor 20 can be branched off from the suction tract at the branching point A1, and can be introduced into the secondary air system 52. Because the branching point A1 is arranged downstream of the compressor wheel 22, the air which is branched off from the suction tract 16 at the branching point A1 by means of the secondary air system 52 is also described as compressor air. The compressor air can flow into the secondary air system 52, and is fed to the respective introduction point E by means of the secondary air system 52, and can flow out of the secondary air system 52 and into the exhaust tract 24 at the respective introduction point E. The compressor air is thus introduced, i.e., injected, into the exhaust tract 24 as secondary air at the respective introduction point E. Introducing the air branched off from the suction tract 16 at the branching point A and also described as compressor air or secondary air into the exhaust tract 24 at the respective introduction point E is also described as secondary air injection.

To be able to implement a particularly low-emission operation of the internal combustion engine 10, the secondary air system 52 is also fluidically connected to the suction tract 16 at a second branching point A2. It can be seen that the second branching point A2 is arranged upstream of the compressor 20, and thus upstream of the compressor wheel 22, in particular upstream of the connecting point V2. By means of the secondary air system 52, at least a part of the air flowing through the suction tract 16 upstream of the compressor 20 can be branched off from the suction tract 16 at the second branching point A2, and can be introduced into the secondary air system 52. The air branched off from the suction tract 16 at the second branching point A2 and introduced into the secondary air system 52 is also described as pre-compressor air, and can be fed to the respective introduction point E by means of the secondary air system 52, and introduced, in particular injected, into the exhaust tract 24, in particular as further secondary air, at the respective introduction point E. It can be seen that both the compressor air and the pre-compressor air is used as secondary air, which is branched off from the suction tract 16 at the respective branching point A1 or A2, and is introduced into the suction tract 24 at the respective introduction point E. The respective introduction point E is arranged upstream of the exhaust gas post-treatment device 48. In the exemplary embodiment depicted in the FIGURE, the respective introduction point E is arranged upstream of the turbine 26, and in particular upstream of the connecting point V3.

The secondary air system 52 has a first branch Z1, which is fluidically connected to the suction tract 16 at the second branching point A2 and fluidically connected to the exhaust tract 24 at the respective introduction point E. It can be seen that the secondary air system 52 has a secondary air pump 54 which can in particular be operated electrically, by means of which air pump the pre-compressor air branched off at the second branching point A2 can be fed through the secondary air system 52, in particular through the first branch Z1, and fed to the respective introduction point E. The secondary air pump 54 is arranged in the first branch Z1.

The secondary air system 52 additionally comprises a first check valve 56, which is arranged downstream of the secondary air pump 54 in the first branch Z1. The check valve 56 closes in the direction of the secondary air pump 54, and thus avoids a flow of air through the branch Z1 in the direction of the secondary air pump 54. The check valve 56 opens in the direction of the respective introduction point E, however, meaning that the check valve 56 permits the flow of secondary air, in particular pre-compressor air, from the secondary air pump 54 to the respective introduction point E. The secondary air system 52 has a second branch Z2, which is fluidically connected to the suction tract 16 at the first branching point A1. The second branch Z2 is fluidically connected to the first branch Z1 at an opening point M. It can be seen that the opening point M is arranged downstream of the secondary air pump 54, in particular downstream of the check valve 56. The second branch Z2 can thus be flowed through by the compressor air. A second check valve 58 of the secondary air system 52 is arranged in the second branch Z2. The second check valve 58 closes in the direction of the opening point M and opens in the direction of the branching point A.

The secondary air system 52 additionally comprises a shutoff valve 60 provided in addition to the check valves 56 and 58, which shutoff valve is arranged in the second branch Z2, and upstream of the check valve 58 and downstream of the branching point A1. The secondary air system 52 has a pressure sensor 62, by means of which a pressure present in the secondary air system 52, in particular downstream of the opening point M, can be detected. The secondary air system 52 further comprises a valve element 64, which is in particular arranged in the branch Z1. The valve element 64 is presently arranged downstream of the opening point M, and in particular downstream of the pressure sensor 62. The valve element 64 is for example a secondary air valve, in particular an exhaust gas combination valve. For example, a quantity of the secondary air which is introduced into the exhaust tract 24 at the respective introduction point E can be adjusted by means of the valve element 64. It can be seen that the compressor air can mix with the pre-compressor air at the opening point M, and can thus form a total secondary air, wherein a quantity of the total secondary air can in particular be adjusted by means of the valve element 64, which quantity should be or is introduced into the exhaust tract 24 at the respective introduction point E. In one embodiment, it would be conceivable that the check valve 58 opens in the direction of the opening point M and closes in the direction of the branching point A1, and thus, for example, permits a flow of the compressor air as secondary air from the branching point A1 to the opening point M, and suppresses a reverse flow, i.e., a flow of air from the opening point M in the direction of the branching point A1.

LIST OF REFERENCE CHARACTERS 10 internal combustion engine
12 engine block
14 cylinder
16 suction tract
18 exhaust gas turbocharger
20 compressor
22 compressor wheel
24 exhaust tract
26 turbine
28 turbine wheel
30 shaft
32 air filter
34 throttle flap
36 air recirculation system
38 air recirculation conduit
40 air recirculation valve
42 bypass device
44 bypass conduit
46 bypass valve
48 exhaust gas post-treatment device
50a-c exhaust gas post-treatment element
52 secondary air system
54 secondary air pump
56 check valve
58 check valve
60 shutoff valve
62 pressure sensor
64 valve element
A1 first branching point
A2 second branching point
E introduction point
M opening point
V1 connecting point
V2 connecting point
V3 connecting point
V4 connecting point
Z1 first branch
Z2 second branch

The invention claimed is:

1. An internal combustion engine (10) for a motor vehicle, comprising:
a suction tract (16) which is flowable through by air;
a compressor (20) disposed in the suction tract (16) for compressing air flowing through the suction tract (16);

an exhaust tract (24) which is flowable through by exhaust gas of the internal combustion engine (10);
a turbine (26) disposed in the exhaust tract (24), wherein the turbine (26) drives the compressor (20);
a secondary air system (52) which is fluidically connected to the exhaust tract (24) at an introduction point (E) and to the suction tract (16) at a first branching point (A1) disposed downstream of the compressor (20), wherein at the first branching point (A1) at least a part of air compressed by the compressor (20) is branchable off from the suction tract (16) and is introducible into the exhaust tract (24) at the introduction point (E) as secondary air;
wherein the secondary air system (52) is also fluidically connected to the suction tract (16) at a second branching point (A2) disposed upstream of the compressor (20), wherein at the second branching point at least a part of air flowing through the suction tract (16) upstream of the compressor (20) is branchable off from the suction tract (16) by the secondary air system (52) and is introducible into the exhaust tract (24) at the introduction point (E) as secondary air; and
a secondary air pump (54), wherein air branched off at the second branching point (A2) is feedable through the secondary air system (52) and is feedable to the introduction point (E) by the secondary air pump (54); and
wherein the introduction point (E) is upstream of the turbine (26).

2. The internal combustion engine (10) according to claim 1, wherein the secondary air system (52) has a first branch (Z1) which is fluidically connected to the suction tract (16) at the second branching point (A2) and to the exhaust tract (24) at the introduction point (E) and wherein the secondary air pump (54) is disposed in the first branch (Z1).

3. The internal combustion engine (52) according to claim 2, further comprising a first check valve (56) disposed in the first branch (Z1) downstream of the secondary air pump (54), wherein the first check valve (56) closes in a direction of the secondary air pump (54) and opens in a direction of the introduction point (E).

4. The internal combustion engine (10) according to claim 2, wherein the secondary air system (52) has a second branch (Z2) which is fluidically connected to the suction tract (16) at the first branching point (A1) and to the first branch (Z1) at an opening point (M).

5. The internal combustion engine (10) according to claim 4, further comprising a second check valve (58) disposed in the second branch (Z2), wherein the second check valve (58) opens in a direction of the first branching point (A1) and closes in a direction of the opening point (M).

6. The internal combustion engine (10) according to claim 5, wherein a shutoff valve (60) is disposed in the second branch (Z2) upstream of the second check valve.

7. The internal combustion engine (10) according to claim 4, further comprising a first check valve (56) disposed in the first branch (Z1) downstream of the secondary air pump (54), wherein the first check valve (56) closes in a direction of the secondary air pump (54) and opens in a direction of the introduction point (E) and wherein the opening point (M) is disposed downstream of the first check valve (56).

8. The internal combustion engine (10) according to claim 1, wherein the introduction point (E) is disposed in an outlet conduit that is assigned to a combustion chamber of the internal combustion engine (10) and that is formed by a cylinder head of the internal combustion engine (10).

9. An internal combustion engine (10) for a motor vehicle, comprising:
a suction tract (16) which is flowable through by air;
a compressor (20) disposed in the suction tract (16) for compressing air flowing through the suction tract (16);
an exhaust tract (24) which is flowable through by exhaust gas of the internal combustion engine (10);
a secondary air system (52) which is fluidically connected to the exhaust tract (24) at an introduction point (E) and to the suction tract (16) at a first branching point (A1) disposed downstream of the compressor (20), wherein at the first branching point (A1) at least a part of air compressed by the compressor (20) is branchable off from the suction tract (16) and is introducible into the exhaust tract (24) at the introduction point (E) as secondary air;
wherein the secondary air system (52) is also fluidically connected to the suction tract (16) at a second branching point (A2) disposed upstream of the compressor (20), wherein at the second branching point at least a part of air flowing through the suction tract (16) upstream of the compressor (20) is branchable off from the suction tract (16) by the secondary air system (52) and is introducible into the exhaust tract (24) at the introduction point (E) as secondary air; and
a secondary air pump (54), wherein air branched off at the second branching point (A2) is feedable through the secondary air system (52) and is feedable to the introduction point (E) by the secondary air pump (54); and
wherein the introduction point (E) is disposed in an outlet conduit that is assigned to a combustion chamber of the internal combustion engine (10) and the outlet conduit is formed in a cylinder head of the internal combustion engine (10).

* * * * *